United States Patent Office 2,702,265
Patented Feb. 15, 1955

2,702,265

PRODUCTION OF RIBOFLAVIN BY ASHBYA GOSSYPII

Karl L. Smiley and Leonard Stone, Peoria, Ill., assignors to Hiram Walker & Sons Inc., Peoria, Ill.

No Drawing. Application October 26, 1953, Serial No. 388,456

45 Claims. (Cl. 195—28)

This application is a continuation-in-part of our prior application Serial No. 259,714, filed December 3, 1951, which is a continuation-in-part of our application Serial No. 770,330, filed August 23, 1947.

The present invention relates to the biological synthesis of riboflavin in connection with the cultivation or propagation of the ascomycete *Ashbya gossypii*. More particularly, it relates to means for increasing or augmenting the yields of riboflavin produced by this organism not only in media in which it normally produces substantial yields of riboflavin, but also in media in which it otherwise propagates with yields of riboflavin which are negligible or practically insignificant, i. e., so small that its recovery is not practicable. The invention contemplates not only procedures aimed at the production of riboflavin-containing mashes or media from which riboflavin may be recovered in a greater or less degree of purity, as desired, but also at production of such mashes or media which may be dried, with or without prior separation of extraneous material, to secure products containing, in addition to riboflavin, associated vitamins and animal growth factors, for use as animal feed supplements.

*Ashbya gossypii*, the organism which is employed in our process, is related to, but distinct from, *Eremothecium ashbyii*, the riboflavin-producing ability of which is well known. Guilliermond and co-workers have pointed out both morphological and physiological characteristics which serve to differentiate the two organisms. According to these investigators *Ashbya gossypii* exists almost exclusively in the mycelial state, whereas in *Eremothecium ashbyii* the budding form predominates. Likewise, with the former, cells which give rise to ascospores are plurinucleate rather than mononucleate as in *Eremothecium ashbyii*. The difference in shape between vegetative spores of the two organisms also serves to distinguish them. Of greater significance in the present instance is the observation of Schopfer, subsequently confirmed by other investigators, that *Ashbya gossypii*, in media in which *Eremothecium ashbyii* produces substantial yields of riboflavin, is incapable of producing more than traces of riboflavin. Thus, whereas with *Eremothecium ashbyii*, substrates of widely varying composition may be utilized successfully for production of riboflavin, it has been our experience as well as that of others that the requirements of substrates for securing appreciable yields of riboflavin in the propagation of *Ashbya gossypii* are quite limited and specific.

In accordance with the present invention we have found that in media capable of supporting the growth of the organism *Ashbya gossypii*, including media in which the yields of riboflavin have been negligible or practically insignificant, substantial yields of riboflavin may be secured and the synthesis of riboflavin greatly augmented by supplementing the medium with a propionate radical-yielding compound of the class consisting of propionic acid, its calcium, alkali metal and ammonium salts, its lower alkyl esters and its aryl and aryl-alkyl esters with not more than 9 carbon atoms. When such compounds are present in the medium in molar concentrations of from about 0.001 to 0.03, riboflavin production proceeds more rapidly and final yields in a given period are substantially increased and in many cases greatly multiplied over those in any comparable media lacking the propionate-yielding compound. Furthermore, we have also found that when brewer's yeast or yeast substance-containing material, such as yeast extract or yeast cell substance, is added with or is present in conjunction with a propionate radical-yielding compound as referred to above, a markedly greater increase in yield of riboflavin is secured over that produced in the same medium without the presence of the yeast or yeast substance.

As will more fully hereinafter appear, our process may be employed to fortify the constituents of the medium or mash in which the organism is propagated, for example, fermentation residues or other proteinaceous grain processing residues, with riboflavin, or if desired, more potent concentrates, or even the crystalline vitamin, can be prepared. Over and above riboflavin, this organism elaborates certain as yet unidentified factors which are important in poultry and animal nutrition. Therefore, the method which has been developed in accordance with our invention is especially suitable for manufacturing adjuncts to animal feeds.

The fermentative process may be conducted generally in the manner of that described in United States Patent No. 2,595,827 of C. S. Boruff et al., granted May 6, 1952, in which the nutrient content of stillage from grain alcohol fermentations is enhanced by refermentation. In this procedure, grain alcohol thin stillage is adjusted to the proper reaction for subsequent fermentation by the addition of alkali. The medium is then preferably supplied with carbohydrate and/or assimilable nitrogen and is sterilized. After cooling, the medium is inoculated with *Ashbya gossypii* and agitated mechanically and aerated while being maintained at the optimum temperature for vitamin production. After refermentation the liquor can be concentrated and dried in any one of several ways well known in the art.

In carrying out the present invention, the basal medium or substrate employed is one in which the organism *Ashbya gossypii* may be effectively propagated, even with negligible or practically insignificant yields of riboflavin, although it is preferred to employ media or substrates in which substantial yields of riboflavin are secured. We incorporate in the medium a propionate radical-yielding compound, as hereinafter more fully set forth, and which we have found to guide the activity of the organism in the direction of riboflavin biosynthesis. The presence of such compounds causes the organism to produce substantial yields of riboflavin even in media in which, in the absence of the propionate radical-yielding compound, the organism produces an inappreciable or practically negligible yield of riboflavin; and in media in which substantial yields of riboflavin are otherwise produced, the presence of such compounds greatly augments the yield of riboflavin synthesized by the organism. As will be more fully set forth hereinafter, the presence of both yeast substance-containing materials and a propionate radical-yielding compound even more greatly enhances the yield of riboflavin.

In preparing the medium in the practice of the invention, we incorporate in the medium a proteinaceous material of plant or animal origin, which may be hydrolyzed, partly hydrolyzed or unhydrolyzed, although generally the presence of at least a minor proportion of protein hydrolysis products is preferred, with say at least 5% of the protein nitrogen represented by protein hydrolysis products. The hydrolysis may be effected by the action of acid or enzymes by the customary procedures known in the art. Thus we may employ plant proteinaceous materials, such as zein, wheat gluten, hordein, soybean casein, or the like; grain meals and protein containing products derived from grains, such as corn meal, ground wheat, oats, milo, barley or the like, soybean meal, linseed meal, corn germ, meal, wheat germ, wheat middlings, red dog flour or the like, and plant proteinaceous materials which have been at least partly hydrolyzed by acid or enzyme action, such as soybean peptone, grain mashes which have been subjected to the proteolytic action of enzymes such as those of barley malt, and proteinaceous grain processing residue, such as corn steep liquor, grain alcohol fermentation stillage, acetone-butyl alcohol fermentation stillage, or the like. As the animal proteinaceous material we may employ raw or cooked ground meats, beef or other meat extracts, casein, hydrolyzed casein, egg white, blood, packing house stick liquor, blood albumin, tankage, peptone, or the like. As in the case of the plant proteinaceous material, the animal proteinaceous materials may be at least partially degraded by acid or enzyme action, or both. In general it is found that mixtures of the proteinaceous materials and particularly mixtures of the plant and animal proteinaceous materials give superior yields of riboflavin.

The proportion of proteinaceous material employed may be such as to provide from 0.5 to 10% or higher (as solids) in the medium, although generally from 1 to 5% is found most suitable.

The presence in the medium of a carbon source of the class consisting of the metabolizable carbohydrates and lipids markedly improves the riboflavin yield, particularly when both are employed in admixture. The proportion employed may be from 0.1 to about 7%. When carbohydrate alone is employed, it is preferred to add sufficient to give a concentration of 1.0% to 4.0%. Thus metabolizable carbohydrate equivalent to about 1.5 to 2.5% is generally employed in deep tank fermentation, while from about 2.0 to 4.0% carbohydrate is optimal for shaken cultures. Lower levels of carbohydrate cause a corresponding reduction in vitamin synthesis while higher levels, i. e. greater than about 4.0%, although not deleterious, do not correspondingly promote synthesis and consequently are not economical. Various sources of carbohydrate may be used, such as commercial crude and pure glucose, sucrose, maltose, maltose syrups, hydrol and black-strap, high-test, or refiners' molasses. With certain of these materials, e. g., some types of molasses, it has been found advantageous to mix the carbohydrate as received with an equal weight of water and hydrolyze with dilute mineral acid for 15 to 30 minutes at a steam pressure of 15 p. s. i. g. (pounds per square inch gauge) before incorporating it into the medium.

The lipid employed may be an animal fat or oil or a vegetable oil, which for convenience in use, should have a melting point below the temperature at which the propagation of the organism is carried out. Suitable materials for this purpose are corn oil, cottonseed oil, soybean oil, palm oil, olive oil, or the like, and lard, butter, olein, or the like. In general, the proportion of the lipid which is used is preferably in the range from 0.1 to 2.5% when used in the absence of carbohydrate. Similar proportions give improved results when carbohydrate is present, and likewise the addition of even small amounts of carbohydrate greatly improves the yields when lipids are the principal carbon source. Thus, in similar media, with 0.1 to 2.5% of lipid present, the addition of 0.1 to 2.5% glucose may increase the yield of riboflavin from 50 to 100%; and with 2 to 4% glucose present, the addition of 0.1 to 2% lipid likewise greatly increases the riboflavin yield. Optimum yields of riboflavin have been secured from media containing 2 to 4% carbohydrate and 0.25 to 1.0% lipid.

We likewise preferably incorporate in the medium an alkali or alkaline earth metal carbonate, as it appears to stimulate the activity of the organism in the direction of an increased riboflavin synthesis. As examples of satisfactory forms of carbonate we mention specifically calcium carbonate, sodium carbonate, potassium carbonate and magnesium carbonate, as well as combinations of these salts. The maximum stimulatory response is produced by adding any of them to give a concentration of from about 0.1 to 1.0%. However, the presence of carbonate in the medium is not essential to secure the effect of the addition of propionate in accordance with this invention.

In accordance with our present invention, we further supplement the medium and stimulate the yield of riboflavin with a propionate radical-yielding compound of the class consisting of propionic acid, its calcium, alkali metal and ammonium salts and its lower alkyl esters. Aryl and aryl-alkyl esters, preferably having not more than 9 carbon atoms may also be employed. When such compounds are present in the medium in molar concentrations of from about 0.001 to 0.03, riboflavin production proceeds more rapidly and final yields are substantially increased over those in comparable media lacking the propionate radical-yielding compound. In media in which the organism propagates with negligible or no substantial yields of riboflavin, the incorporation of a propionate radical-yielding compound has a directive influence, and causes the synthesis of substantial yields of the flavin. Levels of the propionate radical-yielding compound appreciably over 0.03 molar inhibit growth and generally reduce the riboflavin yield.

For the purpose of illustrating the procedures employed in carrying out the present invention with respect to preparation of the medium, its handling, inoculation with the organism and propagation of the latter, we set forth a general description of an operation employing a medium containing both plant and animal proteinaceous material. Insofar as specific constituents of the medium are referred to in this description, they are merely illustrative, the primary purpose thereof being to set forth generally the conditions employed.

In preparing the medium, a proteinaceous grain processing residue or other plant proteinaceous material may be employed. If not of a concentration within the desired range, it is preferably diluted with water to give from 0.4 to 3% of solids derived from such residues in the medium. Within this range, the preferred concentrations of the solids from the grain processing residue may vary somewhat. Thus, with a grain alcohol stillage derived from a mixed grain mash, the concentration of the stillage solids may be from 0.75 to 2.25%. With corn steep liquor, a solids concentration in the fermentation medium of from about 0.5 to 3.0% is preferred.

With reference to the animal proteinaceous products, packing house stick liquor or tankage may be used. Partial degradation of the animal protein supplement is desirable for best yields and this can be accomplished, if necessary, by treatment with either acids or enzymes or combinations thereof. The optimum concentration of these products in the final medium ranges from about 0.5 to 4.0 percent depending upon their moisture and content of essential factors. From 1.0 to 2.0 percent stick liquor containing about 50 percent solids is commonly used.

To prepare a growth medium containing the above ingredients, the proteinaceous grain processing residue or other plant proteinaceous material is first diluted with water, after which the carbohydrate, animal protein, carbonate and propionic acid supplements are added. The pH of the mixture is generally found to be in the range from about 3.7 to 4.7 and is adjusted either prior to or after sterilization by adding soda ash or sodium hydroxide, although other alkalizing agents, such as the hydroxides and carbonates of the alkali and alkaline earth metals, could also be used.

Sterilization is effected by holding the medium preferably at about pH 4.0 to 5.0 under a steam pressure of about 15 to 25 p. s. i. g. for 30 to 60 minutes, or by flash sterilization at 280–300° F. for 3 to 4 minutes, although various other procedures could be used. It has been found, however, that longer periods of sterilization, as well as higher temperature for an equal length of time, are deleterious to riboflavin production and should be avoided.

The initial pH of the medium may vary from about 5.0 to 8.0 although it has been found preferable to adjust the medium before inoculation to a pH between about 5.5 and 7.0. During fermentation the medium at first becomes more acid, i. e., in the neighborhood of pH 4.8 to 5.0, then later rises to a final reaction between about pH 7.5 and 8.5.

In small flasks, aeration of the medium is accomplished by employing volumes of medium equal to about one-fourth the total volume of the flask and placing the flasks in a continuous reciprocating shaking machine. For larger volumes of medium, sterile air is introduced directly and dispersed preferably in a finely divided state within the medium. Perforated pipe or porous stone spargers are suitable for this purpose. Mechanical agitation has been found to improve the efficiency of aeration and tends to reduce the volume of air required. Aeration rates from about 0.05 to 1.0 and preferably 0.05 to 0.5 volume of air per volume of medium per minute are employed depending upon the dimensions of the fermenter. It should be understood, however, that various other aeration techniques could be utilized to effect aeration of the mash and that our process is not restricted to the particular method mentioned.

The temperature at which fermentation can be conducted may range from about 18° to 35° C. It is preferable, however, to maintain the temperature between 22° and 32° C. for most rapid production and best yields of riboflavin. When the temperature is held below 18° C. growth and vitamin production are retarded, while at temperatures appreciably above 35° C. riboflavin synthesis is reduced.

Inocula are usually prepared by transferring from an actively-growing culture which is carried on an agar slant to a small flask of liquid medium such as peptone-glucose solution. This flask is aerated by shaking and employed after 24 or 48 hours to inoculate a large volume of the same medium. Aeration is effected in this culture by directly introducing sterile air. After a period of 24 to 48 hours this culture is transferred to thin stillage medium. We prefer to use approximately 3% of inoculum by volume, although equally good results are obtained with inocula from about 0.1 to 5.0% by volume. Larger amounts of inoculum have been found to depress vitamin formation although growth is not affected.

Incubation for at least three to four days is commonly required to attain maximum riboflavin formation, and frequently a period of five or six days is found desirable. The length of incubation, of course, is dependent upon such other factors as temperature, pH, availability of carbohydrate or lipid and other nutrients, etc. and may be as short as 48 hours or as long as one week. When the fermentation is completed, riboflavin recovery can be carried out in any of several ways. The whole fermented medium may be adjusted to a pH favoring the stability of riboflavin, namely from about 2.5 to 6.5, evaporated to a syrup, and dried on a drum or spray drier. In this manner all the vitamins and animal growth factors produced by the organism are retained in the final product. If it is desirable to secure higher riboflavin potencies in the final product, the extraneous material may be separated prior to drying by filtration, centrifuging, precipitation, or other known means. If this procedure is followed, complete liberation of riboflavin from the cells of *Ashbya gossypii* is first brought about by adjusting the pH to about 2.5 to 6.0 by addition of acid such as hydrochloric, sulphuric, nitric, or other mineral acid and heating the culture to a temperature in the neighborhood of 90–150° C. for a period of 10 to 30 minutes. Absorption-elution techniques may also be used to bring about a further purification of riboflavin from the hydrolyzed and clarified liquors.

Our invention may be illustrated more specifically by the following examples:

EXAMPLE 1

A medium was prepared consisting of 50% by volume of stillage obtained from a primary fermentation mash consisting of 86.6% corn, 3.1% rye and 10% barley malt, and also containing 1.0% peptone, 2.0% glucose and 0.1% calcium carbonate. Equal amounts of the medium were placed in fermentation flasks. Sodium propionate was added to duplicate flasks to provide concentrations from 0 to 0.03 molar. The flasks were adjusted to pH 6.2 and were plugged with cotton and sterilized with steam at a pressure of 15 p. s. i. g. for 20 minutes. After cooling, each flask was seeded with 1.0% of an actively growing culture of *Ashbya gossypii*. The cultures were incubated for five days at 30° C., during which time the flasks were shaken continuously in a mechanical shaker. The riboflavin yields were determined fluorometrically. In each case, the values given in the table below are the averages of determinations from duplicate flasks. The results were as follows:

Table 1

| Propionic Acid Concentration, Molar | Riboflavin Yield, μg./ml. | Increase, μg./ml. |
|---|---|---|
| None | 330 | |
| 0.001 | 360 | 30 |
| 0.005 | 553 | 223 |
| 0.01 | 785 | 455 |
| 0.02 | 600 | 270 |
| 0.03 | 360 | 30 |

(Note) In this and the following experiments employing flasks, the flasks were approximately 20% filled with the medium employed.

With larger proportions of propionic acid, the yields of riboflavin are further materially reduced.

EXAMPLE 2

Media were prepared containing varying concentrations of solids from grain alcohol stillage obtained from a primary fermentation mash consisting of 16% corn, 71% milo, 3.2% feed barley and 9.8% barley malt. In each case, the stillage was supplemented with 2% animal stick liquor, 2% glucose and 0.1% calcium carbonate. The media were in each case adjusted to pH 6.5 by the addition of small amounts of sodium hydroxide, where necessary, and divided into equal volumes, which were placed in equal amount in similar fermentation flasks. For each concentration of stillage solids, propionic acid was added in duplicate flasks to provide a concentration of 0.01 molar and no propionate compound was added to duplicate flasks, which served as controls. The flasks were sterilized at 15 p. s. i. g. for 20 minutes, and after cooling were inoculated with 1% of an actively growing culture of *A. gossypii*. They were then incubated at 28–29° C. for 6 days. Riboflavin was determined fluorometrically on the culture liquors. The values given below are the averages of duplicate flasks.

Table 2

| Stillage Solids, Percent | Riboflavin, μg./ml. | | Increase, μg./ml. |
|---|---|---|---|
| | Without Propionate | With Propionate | |
| None | 250 | 265 | 15 |
| 0.66 | 275 | 325 | 50 |
| 1.00 | 320 | 380 | 60 |
| 1.32 | 387 | 425 | 38 |
| 1.65 | 365 | 440 | 75 |
| 2.00 | 290 | 425 | 135 |

The proportion of stillage solids may be further increased to provide a total content of proteinaceous material of as high as 10% or even higher, but the riboflavin yield is not proportionally increased. However, the effect of the propionate in stimulating riboflavin synthesis is marked at all proportions of the stillage solids and is apparent in their absence, with only animal proteinaceous material present.

EXAMPLE 3

A basal medium was prepared consisting of 50% by volume of grain alcohol stillage obtained from a primary fermentation mash composed of 88.5% corn, 3% barley and 8.5% barley malt, with 0.1% calcium carbonate and 2.0% of glucose. Equal amounts of the medium were placed in fermentation flasks. Various proteinaceous plant products or products of plant origin were added in amounts of 0.5% or 1% to each of four of these flasks. In each set of four flasks containing identicals media, propionic acid was added to two of the flasks to provide a final concentration of 0.01 molar, the other two flasks serving as controls. The flasks were adjusted to pH 6.5 by adding sodium hydroxide, adjusted to equal volumes, plugged with cotton and sterilized with steam at 15 p. s. i. g. for 20 minutes. After cooling, each flask was seeded with 1.0% by volume of an active growth culture of *Ashbya gossypii*. The flasks were incubated for six days at 28° C., during which time they were shaken continuously in a mechanical shaker. The riboflavin yields were determined fluorometrically.

The values given below are the averages of the analyses of duplicate flasks. The results were as follows:

Table 3

| Medium Supplement, Percent | Riboflavin, μg./ml. | | Increase, μg./ml. |
|---|---|---|---|
| | Without Propionate | With 0.01 M Propionate | |
| None | <10 | 352 | >342 |
| 0.5 defatted corn germ meal | <10 | 184 | >174 |
| 1.0 defatted corn germ meal | <10 | 520 | >510 |
| 0.5 zein | <10 | 424 | >414 |
| 1.0 zein | <10 | 616 | >606 |
| 0.5 soybean meal | <10 | 400 | >390 |
| 1.0 soybean meal | <10 | 488 | >478 |
| 0.5 soybean peptone | 64 | 824 | 760 |
| 1.0 cottonseed meal | <10 | 400 | >390 |
| 1.0 linseed meal | <10 | 552 | >542 |
| 1.0 Durum wheat middlings | <10 | 429 | >419 |
| 1.0 Durum wheat germ | <10 | 304 | >294 |
| 1.0 wheat gluten | <10 | 242 | >232 |
| 1.0 standard wheat middlings | <10 | 544 | >534 |
| 1.0 Red Dog Flour | <10 | 358 | >348 |

In this and subsequent tables the symbol <10 means less than 10 and indicates a substantially negligible yield of riboflavin. The high stimulatory effect of the proprionate in stimulating riboflavin yield is apparent in all instances in the foregoing example.

EXAMPLE 4

A basal medium was prepared containing 2.0% corn steep liquor, 0.1% calcium carbonate and 0.25% corn oil. Various proteinaceous supplements of plant origin were added at 1.0% concentration to a series of flasks of this medium. In each series four flasks received 2.0% glucose, two of these also receiving 0.01% molar propionate. Another four received 4.0% glucose and of these, two received 0.01 molar propionate. Propionate was provided as in the previously example. All flasks were adjusted to 6.5 pH, sterilized, and seeded with an actively growing culture of *Ashbya gossypii* as in the previous example. The flasks were incubated in a mechanical shaker as described in Example 3. Riboflavin yields were determined fluorometrically on duplicate flasks and averaged. The results were as follows:

Table 4

| Medium Supplement, Percent | Riboflavin, μg./ml. | | | |
|---|---|---|---|---|
| | 2% glucose | | 4% glucose | |
| | Without Propionate | With .01 M Propionate | Without Propionate | With .01 M Propionate |
| None | 90 | 204 | 110 | 420 |
| 1.0 cottonseed meal | <10 | 250 | 141 | 238 |
| 1.0 linseed meal | <10 | 121 | 350 | 640 |
| 1.0 durum wheat middlings | <10 | 119 | 364 | 784 |
| 1.0 durum wheat germ | <10 | 104 | 448 | 744 |
| 1.0 wheat gluten | 62 | 564 | 568 | 936 |
| 1.0 wheat middlings | <10 | 252 | 328 | 770 |
| 1.0 red dog flour | <10 | 186 | 358 | 576 |
| 1.0 soybean grits | 63 | 448 | 606 | 848 |
| 1.0 soybean peptone | 41 | 461 | 728 | 824 |

In the series of tests presented in this example in which the proteinaceous material in the medium was entirely of plant origin, the highly stimulatory effect of propionates on riboflavin yield was again demonstrated at varying carbohydrate levels, even in media wherein, without propionate, insignificant yields were secured.

EXAMPLE 5

Media were prepared, each containing 1.5% stillage solids of the same character as were employed in the media of Example 2, 2% animal stick liquor, 0.1 calcium carbonate and varying proportions of different carbohydrates as indicated below. Equal amounts of the media were placed in similar fermentation flasks. Propionic acid was added to duplicate flasks to provide a concentration of 0.01 molar and duplicate flasks with no addition of the propionate compound were likewise run. The flasks were sterilized, inoculated with *A. gossypii* and incubated as described in Example 1. Riboflavin yields were determined fluorometrically on duplicate flasks and averaged. The results were as follows:

Table 5

| Carbohydrate | Carbohydrate, Percent | Riboflavin, μg./ml. | | Increase, μg./ml. |
|---|---|---|---|---|
| | | Without Propionate | With Propionate | |
| Molasses | 1 | 77 | 289 | 212 |
| Do | 2 | 124 | 302 | 178 |
| Grain mash saccharified with malt | ¹ 2 | 85 | 320 | 235 |
| Grain mash saccharified with acid | ¹ 2 | 83 | 198 | 115 |
| Glucose | 2 | 340 | 510 | 170 |

¹ The saccharified grain mashes were added in amounts equivalent to 2% sugar, based on their starch content.

EXAMPLE 6

Media were prepared containing varying proportions of solids from corn steep liquor and of animal stick liquor. In each case the medium contained 2% glucose and 0.1% calcium carbonate. The tests were conducted as in Example 2 above. The results were as follows:

Table 6

| Corn Steep Liquor, Percent | Animal Stick Liquor, Percent | Riboflavin yield, μg./ml. | | Increase, μg./ml. |
|---|---|---|---|---|
| | | Without Propionate | With 0.01 M Propionate | |
| 2.0 | 1.0 | 308 | 582 | 274 |
| 2.0 | 2.0 | 408 | 624 | 216 |
| 2.5 | 1.0 | 544 | 726 | 182 |
| 2.5 | 1.5 | 556 | 760 | 204 |
| 2.5 | 2.0 | 360 | 680 | 320 |
| 3.0 | 1.0 | 570 | 772 | 202 |
| 3.0 | 1.5 | 328 | 432 | 104 |
| 3.0 | 2.0 | 280 | 400 | 120 |

EXAMPLE 7

Media were prepared with different proteinaceous grain residue solids and with different animal protein materials, as indicated in the ensuing table. In each case the medium contained 2% glucose and 0.1% calcium carbonate. The tests were conducted as in Example 2 above. The results were as follows:

Table 7

| Corn Steep Liquor, Percent | Peptone, Percent | Animal Stick Liquor, Percent | Riboflavin Yield, μg./ml. | | Increase, μg./ml. |
|---|---|---|---|---|---|
| | | | Without Propionate | With 0.01 M Propionate | |
| 2.5 | 0.5 | | 404 | 592 | 188 |
| 2.5 | | 2.0 | 420 | 704 | 284 |
| Stillage Solids, Percent: | | | | | |
| 1.6 | 0.5 | | 252 | 620 | 368 |
| 1.6 | | 2.0 | 298 | 436 | 138 |

EXAMPLE 8

Media were prepared in which the proteinaceous material present was derived solely from animal sources. The basal medium was an aqueous solution containing 0.1% calcium carbonate, 0.25% dibasic potassium phosphate, 2% glucose and 0.25% corn oil. Various animal proteinaceous substances, as indicated in the following table, were added in proportions ranging from 0.25% to 1% to each of the series of four flasks containing the foregoing basal medium. 0.01 molar propionate was added to two of the four flasks in each group. The flasks were then adjusted to a pH of 6.5, and sterilized in the same manner as in Example 3 above. After cooling, each flask was inoculated with 1.0% by volume of an actively growing culture of *Ashbya gossypii*. The flasks were incubated for six days at 28° C., during which time they were shaken continuously on a mechanical shaker. The riboflavin was determined fluorometrically as in the previous examples. The values given in the following table are the average of the analyses of duplicate flasks. The results are as follows:

Table 8

| Medium Supplement, Percent | Riboflavin, μg./ml. | | Increase, μg./ml. |
|---|---|---|---|
| | Without Propionate | With .01 M Propionate | |
| 0.5 animal peptone | 86 | 328 | 242 |
| 1.0 animal peptone | 115 | 250 | 135 |
| 0.5 animal peptone+.25 animal stick liquor | 65 | 213 | 66 |
| 1.0 animal peptone+.25 animal stick liquor | 93 | 174 | 81 |
| 0.5 animal peptone+0.5 beef extract | 62 | 234 | 172 |
| 0.5 animal peptone+0.5 casein | 125 | 308 | 183 |

It is thus apparent, as illustrated in Examples 5 through 8, as well as in Examples 1 and 2, that the highly stimulatory effect of propionates on riboflavin production are secured where the proteinaceous constituents of the media are derived in part or in whole from animal sources as well as when derived entirely from plant sources. Thus proteinaceous materials of any character may be employed in media for use in carrying out the present invention.

EXAMPLE 9

In another example, as in the previous example, both a metabolizable carbohydrate and a lipid were present in the medium and various combinations of animal and proteinaceous materials were employed. The basal medium was an aqueous solution containing 2.0% glucose, 0.5% corn oil, 0.5% dipotassium phosphate and 0.1% calcium carbonate. Animal and plant proteinaceous material were added as indicated in the following table. With each combination of supplements, four flasks were prepared and 0.01% molar propionate was added to two flasks of each set. The flasks were adjusted to pH 6.5, sterilized, inoculated with an actively growing culture of *Ashbya gossypii* and incubated in the same manner as in the preceding example and in Example 3. The riboflavin was determined fluorometrically. The values given in the following table represent the average analyses of duplicate flasks in each instance.

Table 9

| Medium Supplement, Percent | Riboflavin, μg./ml. | | Increase, μg./ml. |
| --- | --- | --- | --- |
| | Without Propionate | With .01 M Propionate | |
| 2 corn steep liquor+1 animal stick liquor | 142 | 605 | 463 |
| Do | 320 | 720 | 400 |
| 1 soybean meal+1 animal stick liquor | 71 | 110 | 39 |
| 1 soybean meal+1 animal peptone | 252 | 684 | 432 |
| 1 plant peptone+1 animal stick liquor | 98 | 107 | 9 |
| 1 plant peptone+1 animal peptone | 39 | 456 | 417 |
| 1 wheat gluten+1 animal stick liquor | <10 | 87 | 77 |
| 1 wheat gluten+1 animal peptone | 189 | 375 | 186 |

From the foregoing examples it is apparent that the stimulatory effect of propionates on riboflavin synthesis by *Ashbya gossypii* is secured when the carbon source in the medium is entirely carbohydrate or a mixture of carbohydrate and lipid. It is likewise exerted when the carbon source is a lipid, in the absence of carbohydrate. Thus corn oil, cottonseed oil, soybean oil, palm oil, olive oil, lard, butter, olein and other natural fats and oils or mixtures thereof, in proportions as hereinbefore set forth, when employed in media with plant or animal proteinaceous material, show an augmented riboflavin yield in the presence of propionic acid or propionates.

EXAMPLE 10

Tests were made to compare the effectiveness of a lower alkyl propionate, such as butyl propionate with that of propionic acid in increasing the yield of riboflavin with *Ashbya gossypii*. Media were prepared containing 1.5% stillage solids of the character described in connection with Example 2, 1.0% peptone, 2% glucose and 0.1% calcium carbonate. The tests were carried out as described in connection with Example 2 except that, when using butyl propionate, due to its volatility, it was sterilized separately by Seitz filtration and added to the medium after it was sterilized and cooled. The results were as follows:

Table 10

| Additive to Medium | Concentration of Additive | Riboflavin Yield, μg./ml. | Increase, μg./ml. |
| --- | --- | --- | --- |
| None | | 320 | |
| Propionic acid | 0.01 M | 580 | 260 |
| Butyl propionate | 0.005 M | 415 | 95 |
| Do | 0.01 M | 577 | 257 |
| Do | 0.02 M | 495 | 175 |

Other lower alkyl propionates may be employed, such as the ethyl, propyl or amyl esters, to supply the propionate radical to effect the stimulation of riboflavin production of the organism. Aryl and arylalkyl propionates having not more than 9 carbon atoms may also be employed, as the benzyl, phenylethyl, phenylethyl and tolyl propionates.

EXAMPLE 11

Tests showed that in a medium with only propionic acid or propionates present, in the absence of a carbon source, *Ashbya gossypii* fails to grow. Further tests were made to compare the effects of added propionate radical-yielding compound on the biosynthesis of riboflavin by *Ashbya gossypii* with those resulting from a carbon source, such as metabolizable carbohydrate. In these tests the media employed contained 1.6% grain stillage solids of the character used in Example 2, with 2.0% animal stick liquor and 0.1% calcium carbonate. Three different levels of glucose were employed, 1.5%, 2.0% and 2.5%. At each level comparative tests were made with equal additions of glucose and of propionic acid. The tests were carried out as in Example 2. The results were as follows:

Table 11

| Glucose Level, Percent | Glucose Added, Percent | Propionic Acid Added, Percent | Riboflavin Yield, μg./ml. | Increase, μg./ml. |
| --- | --- | --- | --- | --- |
| 1.5 | | | 385 | |
| 1.5 | 0.074 | | 390 | 5 |
| 1.5 | | 0.074 | 975 | 490 |
| 2.0 | | | 440 | |
| 2.0 | 0.074 | | 450 | 10 |
| 2.0 | | 0.074 | 1,100 | 650 |
| 2.5 | | | 450 | |
| 2.5 | 0.074 | | 455 | 5 |
| 2.5 | | 0.074 | 1,180 | 730 |

These results clearly show the extraordinary effects of the supply of the propionate radical in the medium upon riboflavin production by the organism.

EXAMPLE 12

Into a 1300 gallon fermenter equipped with an aerating device and mechanical agitator were pumped 450 gallons of stillage, obtained from a primary fermentation mash consisting of 57.7% corn, 30.6% rye and 11.7% barley malt, and 350 gallons of water. One hundred and fifty pounds of glucose and 150 pounds of stick liquor were added and the fermenter was closed and sterilized for 40 minutes with steam at a pressure of 15 p. s. i. g. The pH during sterilization was 4.1. After sterilization, 14 pounds of sodium carbonate and 5.25 pounds propionic acid which had been sterilized separately in water solution were added which brought the pH to 5.8. The total volume of medium because of steam condensation and the addition of neutralizing agent was approximately 1,000 gallons. The medium was cooled to 29° C. and seeded with 40 gallons of a 24-hour culture of *Ashbya gossypii* grown on 1.0 percent peptone and 1.0 percent glucose. Sterile air was introduced at the rate of 0.15 volume of air per volume of medium per minute and the temperature was maintained at 29° C. Riboflavin production and the pH during the course of fermentation are shown below:

Table 12

| Hours of fermentation | pH | Riboflavin yield, μg./ml. |
| --- | --- | --- |
| 19 | 5.8 | None |
| 44 | 5.8 | 91 |
| 50 | 5.8 | 160 |
| 65 | 6.7 | 390 |
| 72 | 7.2 | 448 |
| 89 | 7.9 | 474 |

EXAMPLE 13

We have found that the enhancement of riboflavin production by the organism *Ashbya gossypii* is stimulated to an extraordinary degree by incorporating into the medium, in addition to a propionate radical-yielding material, a small proportion, suitably 0.25 to 1.5% of yeast substance-containing material, such as, for example, dried brewer's yeast, yeast extract, Buchner yeast juice, yeast fermentation residues or the like. The addition of such yeast substance-containing materials to some media suitable for the propagation of *Ashbya gossypii*, in the abcence of the propionate radical, may not result in any increase in yield of riboflavin and may even result in a diminution of yield, although in other media which do not contain fermentation residues such as the synthetic medium described in the application of Van Lanen et al., Serial No. 77,694, filed Fegruary 21, 1944, such additions augment the yield of riboflavin. In all cases, when both a yeast substance-containing material and a propionate radical-yielding material are incorporated in the medium, the yield of riboflavin is very greatly increased beyond that secured by the propionate alone. This is illustrated in this and the following example.

A basal medium was prepared consisting of 50% by volume of stillage obtained from a primary fermentation of a mash of the same composition as that referred to in Example 3 above, 0.1% calcium carbonate, 1.0% animal stick liquor and 2.0% glucose. Dried brewer's yeast was added in different proportions to each of four flasks of this medium and in two of each series of four, .01 molar propionate was supplied. The media in all flasks was adjusted to a pH of 6.5, sterilized, inoculated with *Ashbya gossypii* and incubated in the same manner as in Example 3. The riboflavin was then determined fluorometrically. The values given in the following table in each case represent the average of the analyses of duplicate flasks.

Table 13

| Medium Supplement, Percent | Riboflavin Yield μg./ml. | | Increase, μg./ml. |
|---|---|---|---|
| | Without Propionate | With 0.01M Propionate | |
| None | 214 | 726 | 512 |
| 0.25 dried yeast (brewer's) | 206 | 978 | 772 |
| 0.5 dried yeast (brewer's) | 180 | 992 | 812 |
| 0.75 dried yeast (brewer's) | 180 | 1,096 | 916 |
| 1.0 dried yeast (brewer's) | 174 | 1,200 | 1,026 |

EXAMPLE 14

This example was carried out in the same way as the preceding example, except that the basal medium used was composed of 2% corn steep liquor, 0.1% calcium carbonate, 1.0% animal peptone, 0.25% corn oil and 2.0% glucose. Dried brewer's yeast in proportions of 0.5% and 1.0% were added to each of a series of four flasks and in each of these series, two of the flasks received 0.01 molar propionate. The procedure as to adjustment of pH, sterilization, inoculation and incubation was as in the preceding example. The resulting riboflavin yield, as given in the table below, in each case represents the average analyses of duplicate flasks.

In the foregoing Examples 8, 9, 13 and 14 the propionate was supplied as propionic acid.

Table 14

| Medium Supplement | Riboflavin Yield, μg./ml. | | Increase, μg./ml. |
|---|---|---|---|
| | Without Propionate | With 0.01M Propionate | |
| None | 424 | 584 | 160 |
| 0.5 dried brewer's yeast | 480 | 816 | 336 |
| 1.0 dried brewer's yeast | 476 | 1,136 | 660 |

In the foregoing Examples 13 and 14, for convenience, the yeast substance-containing material was added in the form of dried brewer's yeast. When added in the form of yeast extract, yeast juice, yeast fermentation residues in similar proportions, based on dried solids, similar results are secured.

It will be noted in foregoing Examples 13 and 14 that in each case the yield of riboflavin was very markedly increased by the conjoint action of the yeast substance and the propionate. In Example 13, for example, in which the basal medium included constituents derived from yeast fermentation, a large increase in yield of 522 μg./ml. was secured by the addition of the propionate alone. With added yeast in proportions from 0.25% to 1.0% in the medium, although the yield of riboflavin was actually reduced in the absence of added propionate, the yield with 0.01 M propionate was even more greatly increased, from 772 to 1026 μg./ml. In Example 14, in which no materials derived from yeast fermentation were present in the basal medium, some increase in riboflavin yield was secured by the addition of the yeast in the absence of propionate. Thus with 0.5% yeast the increase was 56 μg./ml. and with 1% yeast, 52 μg./ml. With 0.01 M propionate, without added yeast, an increase in yield of 160 μg./ml. was secured. With both propionate and yeast however, an enormously greater increase over the yield from the basal medium alone was secured, being 392 μg./ml. with 0.5% yeast and 712 μg./ml. with 1.0% yeast.

Although in many of the preceding examples the propionate radical-yielding compound employed, for reasons of convenience, was propionic acid or a propionate, it has been found that like effects are produced in all media with other propionate radical-yielding compounds of the class above described, including the alkali and alkaline earth metal propionates, ammonium propionate and the lower alkyl, aryl and arylalkyl esters of propionic acid. The effect of propionate in increasing the riboflavin yield is secured with additions of 0.001 to 0.03 molar concentrations of the propionate radical-yielding compounds in all media capable of sustaining the growth of *Ashbya gossypii*, even in media in which, in the absence of a propionate supplement, no substantial quantities of riboflavin are produced. The addition of yeast substance-containing material in proportions of 0.1% to 5.0% in all cases greatly increases the riboflavin yield in the presence of these proportions of propionate radical-yielding compounds.

In its propagation in accordance with the present invention the organism *Ashbya gossypii* synthesizes, besides riboflavin, other vitamins and growth producing factors of value, as more fully set forth below. The riboflavin may be separated out from the final culture liquor, as may other vitamins and materials of value, if desired. However, the entire product of fermentation may be utilized beneficially, for example, as a growth promoting supplement in animal feeds. This is illustrated by the following example.

EXAMPLE 15

Final culture liquor prepared similar to that described under Example 12 was acidified to pH 5.0, evaporated to a syrup, and dried on a drum drier. The dry product was examined for its content of chick growth factors by the following procedure. A starter ration was compounded which contained adequate amounts of all the known dietary factors as recommended by the National Research Council Committee on Animal Nutrition. This ration was divided into three lots, the first of which was not supplemented and served as a control. The second received 5 percent distillers' dried solubles and the third received 4.95 percent of distillers' dried solubles and 0.05 percent of dried *Ashbya gossypii* culture. From 60 to 65 one-day-old chicks were placed on each ration and the three groups were maintained under comparable conditions during a six-week test period. At the end of this time the chicks were weighed and the weights averaged. The average weights after equalizing the numbers as to sex are shown below:

| Ration | Average weight gain of chicks, g. |
|---|---|
| Lot No. 1 | 368 |
| Lot No. 2 | 392 |
| Lot No. 3 | 426 |

In Example 15 it is demonstrated that our final fermentation product, when utilized in animal rations, provides both riboflavin and unidentified growth stimulating factors. The unidentified factors simulate in their growth promoting properties the effects commonly obtained by adding fish or meat products to the ration. However, use of the product is not limited to animal feeds since it is obvious that all or a part of the riboflavin might be separated and employed in pharmaceutical preparations, food products, etc. and the residue incorporated into feed products.

It has been found that, in carrying out the present invention, the so-called Lactobacillus Bulgaricus Factor, also called LBF, is synthesized in unusually large amounts, and appears in the residue of the fermentation process employed as a food supplement, as above set forth. This factor was first reported by Williams, Hoff-Jorgensen and Snell, J. Biol. Chem., vol. 177, pages 933–940 (1949). Crude concentrates have been found to increase the weight gain of chicks and rats and this factor may be an important constituent of the ration of various animals. *Ashbya gossypii*, fermented under the conditions of the present invention, produces from twelve to over twenty times as much of the LBF as do related yeast and yeast-like organisms, such as *Candida crusoides* (arborea), *Mycotorula lipolytica*, *Saccharaomyces cerevisia* and *Torula utilis*.

While fermentation with *Ashbya gossypii* is highly effective in the biosynthesis of riboflavin, it also substantially increases the yield of other vitamins, such as pantothenic acid, niacin, pyridoxin, folic acid, biotin and p-aminobenzoic acid. As these substances are likewise carried into the residue product, they likewise enhance greatly its value as an animal feed supplement.

It is apparent that in all media suitable for the effective propagation of *Ashbya gossypii* with biosynthesis of riboflavin, the addition of a propionate radical-yielding compound has a marked, unexpected stimulatory effect upon the riboflavin yield, and that, when further supplemented by yeast substance-yielding materials, a marked increase in this stimulatory effect is secured. Although the invention has been illustrated in connection with various specific examples thereof, it is to be understood that the details of these examples shall not be regarded as limitations upon the scope of the invention, except insofar as included in the accompanying claims.

We claim:

1. The process wherein the ascomycete *Ashbya gossypii* is propagated under aerobic conditions in a liquid medium containing as principal ingredients proteinaceous material and a carbon source from the class consisting of metabolizable carbohydrates and lipids, the step of stimulating the synthesis of riboflavin by the organism by incorporating in said medium a propionate radical-yielding compound of the group consisting of propionic acid, its salts and lower alkyl, aryl and arylalkyl esters, said propionate radical-yielding compound being present in an amount corresponding to a molar concentration of 0.001 to 0.03.

2. The process of claim 1 wherein the carbon source in the medium is a metabolizable carbohydrate.

3. The process of claim 1 wherein the carbon source in the medium is a lipid.

4. The process of claim 1 wherein the carbon source is both a metabolizable carbohydrate and a lipid.

5. The process wherein the ascomycete *Ashbya gossypii* is propagated under aerobic conditions in a liquid medium containing as principal ingredients proteinaceous material and a carbon source from the class consisting of metabolizable carbohydrates and lipids, the step of stimulating the synthesis of riboflavin by the organism by incorporating in said medium a yeast substance-containing material and a propionate radical-yielding compound of the group consisting of propionic acid, its salts and lower alkyl esters, said propionate radical-yielding compound being present in an amount corresponding to a molar concentration of 0.001 to 0.03.

6. The process of claim 5 wherein the carbon source in the medium is a metabolizable carbohydrate.

7. The process of claim 5 wherein the carbon source in the medium is a lipid.

8. The process of claim 5 wherein the carbon source is both a metabolizable carbohydrate and a lipid.

9. The process for producing riboflavin comprising the steps of propagating the ascomycete *Ashbya gossypii* under aerobic conditions in a liquid medium containing as principal ingredients a proteinaceous material, a carbon source from the class consisting of metabolizable carbohydrates and lipids, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

10. The process of claim 9 wherein the carbon source is a metabolizable carbohydrate.

11. The process of claim 9 wherein the carbon source is a lipid.

12. The process for producing riboflavin comprising the steps of propagating the ascomycete *Ashbya gossypii* under aerobic conditions in a liquid medium containing as principal ingredients a proteinaceous material, a carbon source from the class consisting of metabolizable carbohydrates and lipids, a carbonate of the group consisting of the carbonates of the alkali and alkaline earth metals, a yeast substance-containing material, and a propionate radical-yielding compound of the group consisting of propionic acid, its salts and lower alkyl esters, said propionate radical-yielding compound being present in an amount corresponding to a molar concentration of 0.001 to 0.03.

13. The process for producing riboflavin comprising the steps of propagating the ascomycete *Ashbya gossypii* under aerobic conditions in a liquid medium containing as principal ingredients plant proteinaceous material, a carbon source from the class consisting of metabolizable carbohydrates and lipids, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

14. The process for producing riboflavin comprising the steps of propagating the ascomycete *Ashbya gossypii* under aerobic conditions in a liquid medium containing as principal ingredients an animal proteinaceous material, a carbon source from the class consisting of metabolizable carbohydrates and lipids, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

15. The process for producing riboflavin comprising the steps of propagating the ascomycete *Ashbya gossypii* under aerobic conditions in a liquid medium containing as principal ingredients a plant proteinaceous material, an animal proteinaceous material, a metabolizable carbohydrate, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

16. The process for producing riboflavin comprising the steps of propagating the ascomycete *Ashbya gossypii* under aerobic conditions in a liquid medium containing as principal ingredients a plant proteinaceous material, an animal proteinaceous material, a metabolizable carbohydrate, a carbonate of the group consisting of the carbonates of the alkali and alkaline earth metals, a yeast substance-containing material and a propionate radical-yielding compound of the group consisting of propionic acid, its salts and lower alkyl esters, said propionate radical-yielding compound being present in an amount corresponding to a molar concentration of 0.001 to 0.03.

17. The process for producing riboflavin which comprises the steps of propagating the ascomycete *Ashbya gossypii* under aerobic conditions in a liquid medium containing as principal ingredients a proteinaceous grain processing residue, an animal proteinaceous material, a metabolizable carbohydrate, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

18. The process for producing riboflavin which comprises the steps of propagating the ascomycete *Ashbya gossypii* under aerobic conditions in a liquid medium containing as principal ingredients a proteinaceous grain processing residue, an animal proteinaceous material, a metabolizable carbohydrate, a carbonate of the group consisting of the carbonates of the alkali and alkaline earth metals, a yeast substance-containing material and a propionate radical-yielding compound of the group consisting of propionic acid, its salts and lower alkyl esters, said propionate radical-yielding compound being present in an amount corresponding to a molar concentration of 0.001 to 0.03.

19. The process for producing riboflavin comprising the steps of propagating the ascomycete *Ashbya gossypii* under aerobic conditions in a liquid medium containing as principal ingredients grain alcohol stillage solids, an animal proteinaceous material, a metabolizable carbohydrate, a carbonate of the group consisting of a carbonate of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

20. The process of claim 19 wherein the animal proteinaceous material is animal stick liquor.

21. The process of claim 19 wherein the animal proteinaceous material is peptone.

22. The process of claim 19 wherein the metabolizable carbohydrate is glucose.

23. The process of claim 19 wherein the metabolizable carbohydrate is maltose.

24. The process of claim 19 wherein the metabolizable carbohydrate is sucrose.

25. The process for producing riboflavin comprising the steps of propagating the ascomycete *Ashbya gossypii* under aerobic conditions in a liquid medium containing as principal ingredients grain alcohol stillage solids, an animal proteinaceous material, a metabolizable carbohydrate, a carbonate of the group consisting of a carbonate of the alkali and alkaline earth metals, a yeast substance-containing material and a propionate radical-yielding compound of the group consisting of propionic acid, its salts and lower alkyl esters, said propionate radical-yielding compound being present in an amount corresponding to a molar concentration of 0.001 to 0.03.

26. The process for producing riboflavin comprising the steps of propagating the ascomycete *Ashbya gossypii* under aerobic conditions in the liquid medium containing as principal ingredients corn steep liquor, an animal proteinaceous material, metabolizable carbohydrate, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

27. The process of claim 26 wherein the animal proteinaceous material is animal stick liquor.

28. The process of claim 26 wherein the animal proteinaceous material is peptone.

29. The process of claim 26 wherein the metabolizable carbohydrate is glucose.

30. The process of claim 26 wherein the metabolizable carbohydrate is maltose.

31. The process of claim 26 wherein the metabolizable carbohydrate is sucrose.

32. The process for producing riboflavin which comprises the steps of propagating the ascomycete *Ashbya gossypii* under aerobic conditions in a liquid medium containing as principal ingredients from 0.4 to 3% of plant proteinaceous material, 0.5 to 4.0% of animal proteinaceous material, 1.5 to 4.0% of metabolizable carbohydrate, 0.1 to 1.0% of a carbonate of the group consisting of the carbonates of the alkali and alkaline earth metals, and 0.001 to 0.03 molar concentration of a propionate radical-yielding compound of the group consisting of propionic acid, its salts and lower alkyl esters.

33. The process of producing riboflavin which comprises the steps of propagating the ascomycete *Ashbya gossypii* under aerobic conditions in a liquid medium containing as principal ingredients 0.75 to 2.25% grain alcohol stillage solids, 1.0 to 2.0% animal stick liquor, 1.5 to 4% metabolizable carbohydrate, 0.1 to 1.0% calcium carbonate and 0.001 to 0.03 molar concentration of a propionate radical-yielding compound of the group consisting of propionic acid, its salts and lower alkyl esters.

34. The process for producing riboflavin comprising the steps of propagating the ascomycete *Ashbya gossypii* under aerobic conditions and liquid medium containing as principal ingredients 0.5 to 3.0% corn steep liquor solids, 1.0% to 2.0% animal stick liquor, 1.5 to 4.0% metabolizable carbohydrate, 0.1 to 1.0% calcium carbonate and 0.001 to 0.03 molar concentration of a propionate radical-yielding compound of the group consisting of propionic acid, its salts and lower alkyl esters.

35. The process of producing riboflavin which comprises the steps of propagating the ascomycete *Ashbya gossypii* under aerobic conditions in a liquid medium containing as principal ingredients 0.5 to 10% proteinaceous material, from 0.1 to 7% of a carbon source from the group consisting of metabolizable carbohydrates and liquids, 0.1 to 1.0% of a carbonate from the group consisting of the alkali and alkaline earth metal carbonates, and 0.001 to 0.03 molar concentration of a propionate radical-yielding compound of the group consisting of propionic acid, its salts and lower alkyl esters.

36. The process of producing riboflavin which comprises the steps of propagating the ascomycete *Ashbya gossypii* under aerobic condition in a liquid medium containing as principal ingredients 0.5 to 10% proteinaceous material, from 1 to 4% of metabolizable carbohydrate and from 0.1 to 2.5% lipid, 0.1 to 1.0% of a carbonate from the group consisting of the alkali and alkaline earth metal carbonates, and 0.001 to 0.03 molar concentration of a propionate radical-yielding compound of the group consisting of propionic acid, its salts and lower alkyl esters.

37. The process for producing riboflavin comprising the steps of propagating the ascomycete *Ashbya gossypii* under aerobic conditions in a liquid medium containing as principal ingredients from about 0.75 to 2.25% of plant proteinaceous material, from about 0.5 to 4.0% of animal proteinaceous material, a metabolizable carbohydrate, a carbonate of the group consisting of the carbonates of the alkali and alkaline earth metals, and a propionate radical-yielding compound of the group consisting of propionic acid, its salts and lower alkyl esters.

38. The process for producing riboflavin comprising the steps of propagating the ascomycete *Ashbya gossypii* under aerobic conditions in a liquid medium having an initial pH between about 5.0 and 8.0 and containing as principal ingredients proteinaceous materal, carbon source material from the group consisting of metabolizable carbohydrates and lipids, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03.

39. The process of claim 38 wherein a small proportion of yeast substance-containing material is incorporated in the medium.

40. The process for producing riboflavin comprising the steps of propagating the ascomycete *Ashbya gossypii* in a liquid medium containing as principal ingredients a plant proteinaceous material, an animal proteinaceous material, a metabolizable carbohydrate, a carbonate of the group consisting of the carbonates of the alkali and alkaline earth metals, and a propionate radical-yielding compound of the group consisting of propionic acid, its salts, and lower alkyl esters, said propionate radical-yielding compound being present in an amount corresponding to a molar concentration of 0.001 to 0.03, and aerating the medium at a rate from about 0.05 to 1.0 volume of air per volume of medium per minute.

41. The process for producing riboflavin, which comprises the steps of propagating the ascomycete *Ashbya gossypii* in a liquid medium containing as principal ingredients a plant proteinaceous material, an animal proteinaceous material, a metabolizable carbohydrate, a carbonate of the group consisting of the carbonates of the alkali and alkaline earth metals, and a propionate radical-yielding compound of the group consisting of propionic acid, its salts and lower alkyl esters, said propionate radical-yielding compound being present in an amount corresponding to a molar concentration of 0.001 to 0.03, at a temperature from about 18° to about 35° C., and aerating the medium at a rate from about 0.05 to 1.0 volume of air per volume of medium per minute.

42. The process for producing riboflavin which comprises the steps of propagating the ascomycete *Ashbya gossypii* in a liquid medium adjusted initially to a pH between about 5.5 to 7 and containing as principal ingredients a plant proteinaceous material, an animal proteinaceous material, a metabolizable carbohydrate, a carbonate of the group consisting of the carbonates of the alkali and alkaline earth metals, and 0.001 to 0.03 molar concentration of a propionate radical-yielding compound of the group consisting of propionic acid, its salts and lower alkyl esters, at a temperature between about 22° and about 32° C., and aerating the medium at a rate from about 0.1 to 0.5 volume of air per volume of medium per minute.

43. The process of claim 42 wherein a small proportion of yeast substance-containing material is incorporated in the medium.

44. In the production of riboflavin by aerobic fermentation of a nutrient medium with the ascomycete *Ashbya gossypii*, the improvement which comprises conducting the fermentation in the presence of a substance yielding a propionate radical in the range of molar concentration of 0.001 to 0.03.

45. The process as defined in claim 44 wherein the range of molar concentration of the propionate radical-yielding substance is from 0.005 to 0.02.

References Cited in the file of this patent

UNITED STATES PATENTS

| | | |
|---|---|---|
| 2,098,200 | Stiles | Nov. 2, 1937 |
| 2,202,161 | Miner | May 28, 1940 |
| 2,297,671 | Yamasaki | Sept. 29, 1942 |
| 2,374,503 | Rudert | Apr. 24, 1945 |
| 2,400,710 | Piersma | May 21, 1946 |
| 2,445,128 | Tanner | July 13, 1948 |

OTHER REFERENCES

Walker and Coppock, 1928, A. Chem. Soc. J., pages 804, 806.

Schopfer, Helvetica Chimica, Acta V, XXVII, pages 1017–1032.

Porter, Bacterial Chemistry, 1946, Wiley, page 812.

Wickerham et al., Arch. Biochem., vol. 9, No. 1, January 1946, pages 95–98.

Williams et al., Jour. Biol. Chem., vol. 177 (1949), pages 933–940.

UNITED STATES PATENT OFFICE
CERTIFICATE OF CORRECTION

Patent No. 2,702,265 February 15, 1955

Karl L. Smiley et al.

It is hereby certified that error appears in the printed specification of the above numbered patent requiring correction and that the said Letters Patent should read as corrected below.

Column 16, line 3, for "liquids" read --lipids--.

Signed and sealed this 17th day of May 1955.

(SEAL)
Attest:

E. J. MURRY
Attesting Officer

ROBERT C. WATSON
Commissioner of Patents